United States Patent
Lesniak et al.

(10) Patent No.: US 9,211,516 B2
(45) Date of Patent: Dec. 15, 2015

(54) FLUID DISTRIBUTION DEVICE FOR MULTIBED REACTORS

(71) Applicant: UOP LLC, Des Plaines, IL (US)

(72) Inventors: Steven Lesniak, Chicago, IL (US); David A. Fautsch, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 36 days.

(21) Appl. No.: 14/299,401

(22) Filed: Jun. 9, 2014

(65) Prior Publication Data

US 2015/0004074 A1 Jan. 1, 2015

Related U.S. Application Data

(60) Provisional application No. 61/840,524, filed on Jun. 28, 2013.

(51) Int. Cl.
*B01J 19/00* (2006.01)
*B01J 8/04* (2006.01)
*B01J 19/24* (2006.01)
*B01J 8/00* (2006.01)
*B01J 8/02* (2006.01)

(52) U.S. Cl.
CPC .............. *B01J 8/0453* (2013.01); *B01J 8/0492* (2013.01); *Y10T 137/85938* (2015.04)

(58) Field of Classification Search
CPC .................. B01J 8/00; B01J 8/02; B01J 8/04; B01J 8/0446–8/0453; B01J 8/0492; B01J 19/00; B01J 19/24; B01J 19/245
See application file for complete search history.

(56) References Cited

U.S. PATENT DOCUMENTS

| | | | |
|---|---|---|---|
| 4,836,989 A | 6/1989 | Aly | |
| 5,837,208 A | 11/1998 | Grott | |
| 8,177,198 B2 | 5/2012 | Sechrist | |
| 8,181,942 B2 | 5/2012 | Sechrist | |
| 2002/0039547 A1 | 4/2002 | Nelson | |
| 2006/0257300 A1 | 11/2006 | Breivik | |
| 2009/0324464 A1 | 12/2009 | Sechrist | |

FOREIGN PATENT DOCUMENTS

WO 2013017804 A1 2/2013

OTHER PUBLICATIONS

PCT International Search Report for PCT/US2014/044245 dated Oct. 20, 2014.
U.S. Appl. No. 14/299,452, filed Jun. 9, 2014.
U.S. Appl. No. 14/299,373, filed Jun. 9, 2014.
U.S. Appl. No. 14/299,485, filed Jun. 9, 2014.
U.S. Appl. No. 14/299,298 filed Jun. 9, 2014.

*Primary Examiner* — Natasha Young

(57) ABSTRACT

A fluid distribution device is presented for the collection and distribution of fluid between reactor beds. According to various aspects, the device includes a collection tray, a mixing chamber in fluid communication with the collection tray, a rough distribution tray in fluid communication with the mixing chamber, and a fine distribution tray in fluid communication with the rough distribution tray. The rough distribution tray includes an overflow weir with an upper liquid retention baffle.

20 Claims, 3 Drawing Sheets

FLUID DISTRIBUTION DEVICE FOR MULTIBED REACTORS

CROSS REFERENCE TO RELATED APPLICATION

This application claims the benefit of U.S. Provisional Application No. 61/840,524 which was filed on Jun. 28, 2013, the contents of which are hereby incorporated by reference in its entirety.

FIELD OF THE INVENTION

This invention relates to co-current flow reactors where a liquid flows with a vapor through a fixed bed of catalyst. In particular, this relates to the internal components for controlling the flow of vapor and liquid through the reactor when there are multiple catalyst beds, and for redistribution of the fluids.

BACKGROUND OF THE INVENTION

A wide variety of processes use co-current flow reactors, where a fluid or fluids flow over a solid bed of particulate materials, to provide for contact between the fluid and solid particles. In a reactor, the solid may comprise a catalytic material on which the fluid reacts to form a product. The fluid can be a liquid, vapor, or mixture of liquid and vapor, and the fluid reacts to form a liquid, vapor, or a mixture of a liquid and vapor. The processes cover a range of processes, including hydrocarbon conversion, hydrocracking and hydrotreating.

Co-current reactors with fixed beds are constructed such that the reactor allows for the fluid to flow over the catalyst bed. When the fluid is a liquid, or liquid and vapor mixture, the fluid is usually directed to flow downward through the reactor. Multibed reactors are also frequently used, where the reactor beds are stacked over one another within a reactor shell. Typically, they are stacked with some space between the beds.

The interbed spaces are often created to provide for intermediate treatment of the process fluid, such as cooling, heating, mixing and redistribution.

In exothermic catalytic reactions, the control of fluid temperature and distribution is important. The temperature and composition of the fluids from an upper catalyst bed and from outside of the reactor should be well mixed before being distributed to the lower catalyst bed. Initial poor temperature and composition distribution at the top of a catalyst bed can persist or grow as the process fluids move down the reactor. Hot spots can develop and cause rapid deactivation of the catalyst and shorten the reactor cycle length. The space between catalyst beds is for the injection of a quench gas or liquid and for fluid mixing and distribution. In hydrocarbon processing, the quench gas is often a cool hydrogen/hydrocarbon stream. However, cooling a fluid without controlling the mixing and distribution leads to uneven reactions and uneven temperature distribution in subsequent reactor beds. And complex mixing and distribution systems takes up valuable space in a reactor chamber holding multiple catalyst beds.

Due to constraints in the height of the space between reactor beds, there is a limited amount of space for introducing a quench fluid and mixing the vapor and liquid along with the quench fluid. Particularly, for existing hydroprocessing reactors, the space between catalyst beds is already set, and sometimes it is difficult to install new internals for improving mixing of fluids within the existing interbed space without reducing the height of catalyst beds. Even for new reactors, it is often desired to reduce the overall size of the reactors to reduce capital expenditure and the profile of the reactor in a processing plant. Therefore, it is desirable to provide for good mixing of fluids between adjacent catalyst beds in a relatively short interbed space.

The design of reactors to overcome these limitations can save significantly on the valuable space within a reactor for maximizing catalyst loading. Further, it is often desirable to revamp existing reactors to improve processes with the same or reduced quench zone space between catalyst beds. New reactor internals that improve the utilization of the space within a reactor shell can provide significant cost savings, and allow for revamps of existing reactors to meet new operational and regulatory requirements.

SUMMARY OF THE INVENTION

By one aspect, a device is provided for the distribution of fluid over the top of a reactor bed. The device includes collection tray having a top and a bottom, and having outlet ports therethrough. A mixing chamber is provided in fluid communication with the collection tray outlet ports and has a mixing chamber outlet. A rough distribution tray is in fluid communication with the mixing chamber outlet and has rough distribution tray liquid outlet ports therethrough. The device also includes an upstanding overflow weir at an outer edge portion of the rough distribution tray and an upper liquid retention baffle of the overflow weir with at least a portion thereof extending radially inwardly from the overflow weir to retain liquid within the rough distribution tray.

By another aspect, a rough distribution device for use in a downflow reactor is provided that includes a rough distribution tray having a generally flat tray with a plurality of liquid outlet ports therethrough. An upstanding overflow weir is positioned at an edge portion of the rough distribution tray and includes an upper liquid retention baffle with at least a portion extending radially inwardly to retain fluid within the rough liquid distribution tray.

Other objects, advantages and applications of the present invention will become apparent to those skilled in the art from the following detailed description and drawings.

DETAILED DESCRIPTION OF THE INVENTION

Figure 1:
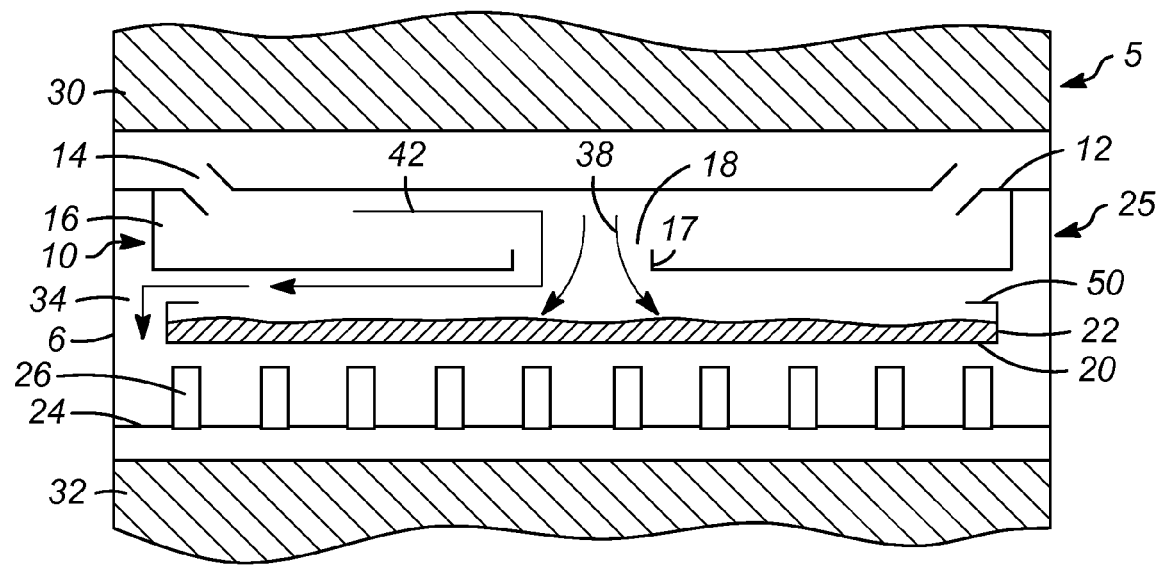
FIG. 1 is a schematic cross-section of a device for the collection and distribution of liquid between catalyst beds.

According to various aspects, the device and apparatus disclosed herein are disposed in the space between adjacent beds in a co-current flow vessel. For ease of explanation the following will be described in terms of a downflow reactor including two or more spaced catalyst beds, but the mixing devices and system, and methods described herein may also be used in and applied to other hydrocarbon processing vessels having different types of processing beds. The catalyst beds in a reactor are separated by space for quench, fluid contacting and/or mixing and distribution of the fluids to the subsequent bed, where the mixing zones are designed to cool/heat, mix, and sometimes condense effluent fluids from a catalyst bed above. In one example, as illustrated in FIG. 1, the device and apparatus may be included in a hydroprocessing downflow reactor 5 and fluid flows from superior catalyst bed 30 to an inferior catalyst bed 32. The fluid may include vapor, liquid, or a mixture of vapor and liquid. The reactor fluid may be quenched with a quench gas or liquid (collectively referred to as "quench fluid" herein) from a quench fluid distributor (not shown), and the fluid is contacted and then distributed to the inferior catalyst bed 32. It should be noted that the term "fluid" as used herein refers to either or both of liquid and vapor. The fluid is contacted to minimize temperature and composition differences before being distributed to the inferior catalyst bed 32 below the mixing zone 25. In current systems, there is considerable space between the reactor beds for quench, mixing, and distribution. A reduction in the amount of space needed for these functions can advantageously provide for maximum catalyst loading within the reactor 5 to improve processing and performance without replacing an entire reactor. Similarly, new reactors may be designed with smaller profiles and at smaller capital expense if the height of quench zones is minimized.

Good distribution of liquids over catalyst beds is important to avoid adverse effects, such as uneven temperature rise and hot spots within the catalyst bed. Hot spots occurring in the catalyst beds can lead to a shortened catalyst life or to poor product quality. The methods and devices described herein are designed to reduce the height of mixing zone 25 without sacrificing fluid mixing and distribution performance.

Turning now to FIG. 1, by one aspect a device 10 for the distribution of fluid over the top of a reactor bed 32 is illustrated. The device 10 is for collecting fluid from a first catalyst bed 30 and redistributing the fluid to a second catalyst bed 32 where the first catalyst bed 30 is above the device 10 and the second catalyst bed 32 is below the device 10. The device 10 includes a collection tray 12 and having outlet ports 14, a mixing chamber 16 in fluid communication with the collection tray 12, and having an outlet 18. The device further includes a rough distribution tray 20 in fluid communication with the mixing chamber outlet 18 and having an overflow weir 22 at the outer edges of the tray 20. The rough distribution tray may be spaced from the reactor walls 6 to provide a generally annular opening 34 between the overflow weir 22 and the reactor walls 6 to facilitate the passage of vapor from above the rough distribution tray 20 to below the rough distribution tray 20. The rough distribution tray 20 also includes a plurality of rough distribution tray outlet ports or openings 36 (shown in FIG. 4) to provide for the flow of liquid therethrough. The device 10 may also include a fine distribution tray 24 positioned below the rough distribution tray 22. The rough distribution tray 20 is in fluid communication with the fine distribution tray 24. The fine distribution tray 24 has a plurality of outlet ports 26 distributed on the tray 24 for providing uniform distribution of liquid to the inferior catalyst bed 32. The outlet ports 26 may include those generally used for fine distribution trays, including, but not limited to sieve trays, bubble caps, and distributors.

Figure 2:
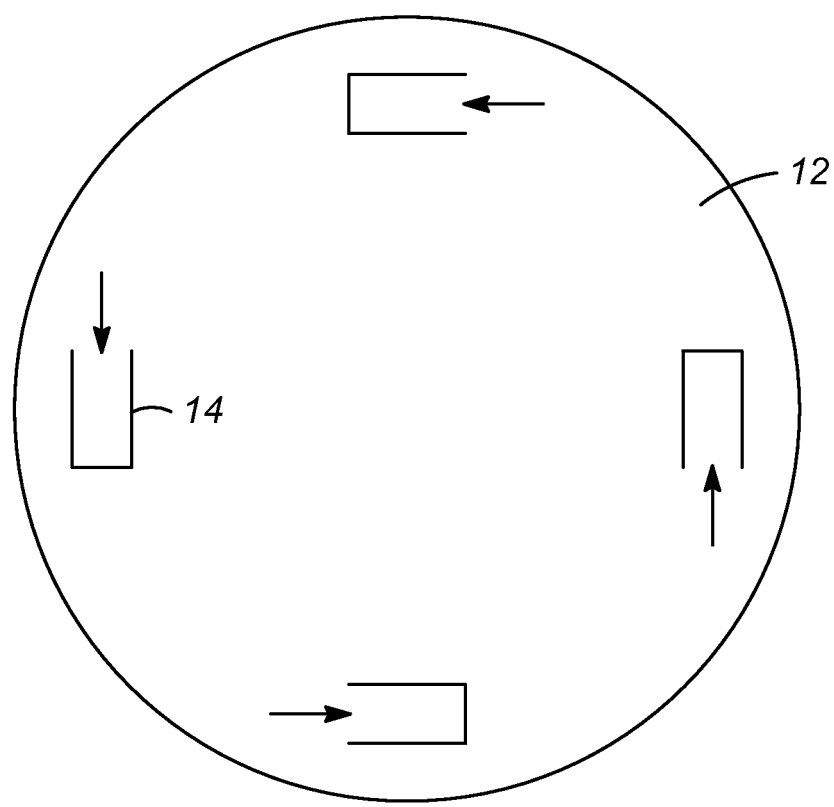
FIG. 2 is a schematic plan view of the arrangement of outlet ports for the collection tray.

The collection tray 12 includes a plurality of outlet ports 14 for delivering liquid to the mixing chamber, as shown in FIG. 2. The outlet ports 14 can be arrayed circumferentially around the tray 12, with a substantially even spacing. In one approach, there are 4 outlet ports 14. The outlet ports 14 are further designed to deliver the fluid in a direction perpendicular or oblique to the radial direction. The liquid flowing from the outlet ports 14 has a downward and circumferential flow direction as it enters the mixing chamber. The liquid and vapor entering the mixing chamber 16 thus has a swirling motion thereby mixing the fluids within the chamber 16. This creates a process fluid that has a more uniform temperature a distribution of liquid components before redistribution of the liquid and vapor to the catalyst bed 32 below the device 10.

Figure 3:
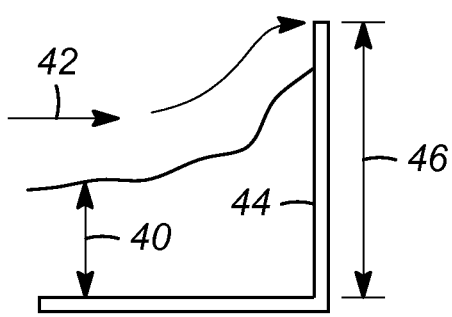
FIG. 3 is a schematic of a prior art rough distribution tray including an overflow weir.

As the process fluid exits the mixing chamber through the outlet 18, the liquid will pass generally downward along path 38 and collect on the rough distribution tray 20 before being distributed through the outlet ports 36. During normal operation, the liquid is collected in the tray 20 to a normal operating liquid level 40. Because the liquid level on the tray may vary during operation, the normal operating liquid level 40 is typically considered to be the maximum liquid level under normal operating conditions. The vapor, on the other hand, tends to flow radially outwardly above the liquid along vapor flowpath 42 toward the annular opening 34 between the rough distribution tray 20 and the reactor walls 6. Some liquid may become entrained in the vapor and flow along the vapor flowpath 42 with the vapor. Due to the high fluid velocities exiting the mixing chamber outlet 18, process liquid often spills outside of the rough distribution tray 20 and passes therebelow through the annular opening 34 with the vapor. In this manner, the liquid bypasses the rough distribution tray outlet ports 36 which can cause undesirable effects on the contacting and distribution of the liquid therebelow. To prevent such liquid spillover, as illustrated in FIG. 3, current systems often include an upstanding overflow weir around the perimeter of a rough distribution tray that extends generally vertically from the rough distribution tray to a height above the maximum liquid level. The overflow weir 44 of prior systems typically extends to a height 46 that is about 200% to 600% of the normal operation liquid level to restrict liquid spillover.

Without intending to be bound by theory, it is believed that the rapid flowrates of the process fluids as they flow through the mixing chamber outlet 18 and into and along the rough distribution tray 20, may cause the liquid to splash within the rough distribution tray 20 and spill through the annular opening 34. Further, as the vapor flows radially at high velocities along path 42, it urges the liquid in the radial direction, which can cause the liquid level along the outside of the rough distribution tray 20 to rise to a higher level than the normal operating liquid level 40 over the majority of the rough distribution tray.

Figure 4:
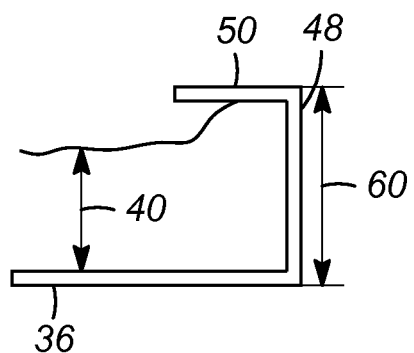
FIG. 4 is a schematic of a portion of a rough liquid distribution tray including an overflow weir and an upper liquid retention baffle in accordance with various embodiments.
Figure 5:
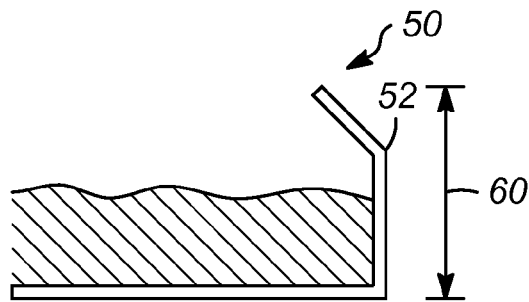
FIG. 5 is a schematic of a portion of a rough liquid distribution tray including an overflow weir and an upper liquid retention baffle in accordance with various embodiments.

By one aspect, in order to restrict liquid spillover, a rough distribution tray 20 as illustrated in FIGS. 1 and 4 is provided that includes an overflow weir 48 extending vertically upwardly from the rough distribution tray 20 and generally around the perimeter of the rough distribution tray 20. The overflow weir includes an upper liquid retention baffle 50 that has at least a portion thereof extending radially inwardly from the overflow weir 48. It has been identified that providing an overflow weir 48 with a radially extending upper liquid retention baffle 50, in accordance with various approaches described herein, can minimize the amount of liquid spillover due to splashing and rising liquid level near the outer edges of the rough distribution tray 20. Without being bound by theory, it is believed that the baffle 50 restricts the liquid from rising near the edges disproportionately to the normal operating liquid level 40, as illustrated in FIG. 4. In this manner, it has been found that the vertical height of the rough distribution zone between the rough distribution tray 20 and the mixing chamber 16 can be reduced by up to 25%, while providing similar or improved performance.

Figure 6:
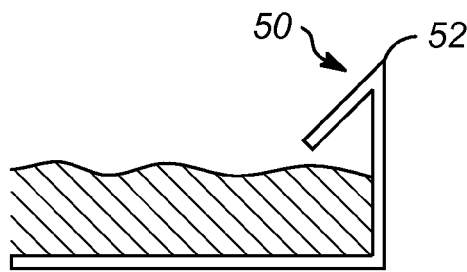
FIG. 6 is a schematic of a portion of a rough liquid distribution tray including an overflow weir and an upper liquid retention baffle in accordance with various embodiments.

Turning now to FIGS. 4-10, various alternative upper liquid retention baffles 50 are illustrated. By one approach, as shown in FIG. 4, the upper liquid retention baffle 50 extends radially inwardly from an upper end portion 52 of the overflow weir 48 and generally orthogonal thereto. In another approach shown in FIG. 5, the upper liquid retention baffle 50 extends axially upward at an incline from the overflow weir upper end portion 52. In the approach of FIG. 6, the upper liquid retention baffle 50 extends axially downwardly at a decline from the overflow weir upper end portion 52.

Figure 7:
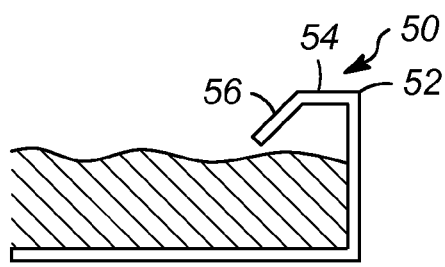
FIG. 7 is a schematic of a portion of a rough liquid distribution tray including an overflow weir and an upper liquid retention baffle in accordance with various embodiments.
Figure 8:
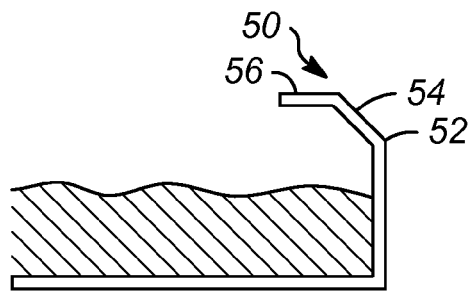
FIG. 8 is a schematic of a portion of a rough liquid distribution tray including an overflow weir and an upper liquid retention baffle in accordance with various embodiments.
Figure 9:
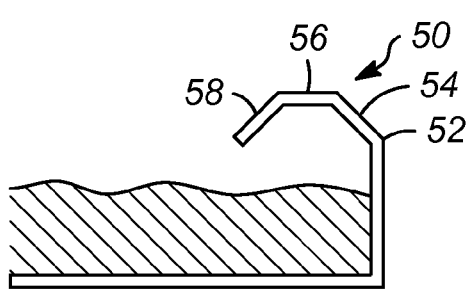
FIG. 9 is a schematic of a portion of a rough liquid distribution tray including an overflow weir and an upper liquid retention baffle in accordance with various embodiments.
Figure 10:
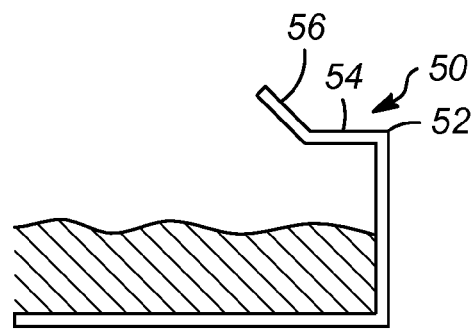
FIG. 10 is a schematic of a portion of a rough liquid distribution tray including an overflow weir and an upper liquid retention baffle in accordance with various embodiments.

In other approaches, the upper liquid retention baffle 50 includes a plurality of baffle portions that extend at different angles from the overflow weir upper end portion 52. In the approach of FIG. 7, the upper liquid retention baffle 50 includes a first portion 54 that extends radially inwardly from an upper end portion 52 of the overflow weir 48 and generally orthogonal thereto and a second portion 56 that extends axially downwardly at a decline from the first portion 54. In the approach of FIG. 8, the upper liquid retention baffle 50 includes a first portion 54 that extends radially axially upward at an incline from the overflow weir upper end portion 52 and a second portion 56 that extends generally orthogonal to the overflow weir 48 from the first portion 54. In the approach of FIG. 9, the upper liquid retention baffle 50 includes a first portion 54 that extends axially upward at an incline from the overflow weir upper end portion 52, a second portion 56 that extends radially inwardly from the first portion 54 and generally orthogonal to the overflow weir 48, and a third portion 58 that extends axially downward at a decline from the second portion 56. In yet another approach, illustrated in FIG. 10, the upper liquid retention baffle 50 includes a first portion 54 that extends radially inwardly from an upper end portion 52 of the overflow weir 48 and generally orthogonal thereto and a second portion 56 that extends axially upward at an incline from the first portion 54.

Further, providing the upper liquid retention baffle 50 restricts liquid spillover, while allowing for a reduction of the total overall height of the overflow weir 48 and liquid retention baffle 50 and accordingly, the space required between the rough distribution tray 20 and the bottom of the mixing chamber 16. In this manner, by one example, the overflow weir 48 having an upper liquid retention baffle 50 may have a total overall height 60 that is between 100% and 195% of the normal operating liquid level 40. By another example, the overflow weir 48 including an upper liquid retention baffle 50 may have a height that is between about 125% and 150% of the normal operating liquid level 40. This is in contrast to overflow weirs of previous systems, which as mentioned above, are typically at least 200% of the normal operating liquid level 40. By another example, the axial height of overflow weir 48 including an upper liquid retention baffle 50 above the rough liquid distribution tray is between about 2% and about 5% of a diameter of the rough distribution tray 20.

While various mixing chambers may be utilized as are generally known in the art, in one approach, the mixing chamber 16 may include a plate affixed to the collection tray 12 by sidewalls, and having an outlet 18 toward the center portion of the mixing chamber 16. The outlet may include a weir 17 to retain some of the liquid during the mixing in the chamber 16.

The device 10 can also include a quench gas injection into the space between the catalyst beds 30, 32. When there is a quench gas injection, it is preferred to inject the quench gas in the vapor space above the collection tray 12 as is generally known to those of ordinary skill in the art. A cool quench gas may be injected at a position near the center axis, and sprayed in an outward radial direction or near the reactor walls and sprayed in an inward radial direction above the collection tray. The spray contacts the vapor and liquid flowing downward from the reactor bed above the quench zone. Heat transfer between the two gases is generally a matter of gas mixing which depends on the momentum exchange between the two vapor streams. Heat transfer to the liquid is typically through the transfer of heat across the liquid droplet surface area.

While the invention has been described with what are presently considered the preferred embodiments, it is to be understood that the invention is not limited to the disclosed embodiments, but it is intended to cover various modifications and equivalent arrangements included within the scope of the appended claims.

The invention claimed is:

1. A device for the distribution of fluid over the top of a reactor bed, comprising:
    a collection tray having a top and a bottom, and having outlet ports therethrough;
    a mixing chamber in fluid communication with the collection tray outlet ports, and having a mixing chamber outlet;
    a rough distribution tray in fluid communication with the mixing chamber outlet and having rough distribution tray liquid outlet ports therethrough;
    an upstanding overflow weir at an outer edge portion of the rough distribution tray; and
    an upper liquid retention baffle of the overflow weir with at least a portion thereof extending radially inwardly from the overflow weir to retain fluid within the rough distribution tray.

2. The device of claim 1, wherein the liquid retention baffle includes a baffle having one edge portion joined to an upper end portion of the overflow weir and an opposite edge portion extending inwardly in a radial direction.

3. The device of claim 2, wherein the liquid retention baffle extends axially upward at an incline from the overflow weir upper end portion.

4. The device of claim 2, wherein the liquid retention baffle extends axially downwardly at a decline from the overflow weir upper end portion.

5. The device of claim 2, wherein the liquid retention baffle extends generally orthogonally from the overflow weir upper end portion.

6. The device of claim 1, wherein the upstanding overflow weir includes an axial height above the rough distribution tray of between about 80% and about 195% of a normal operating liquid level.

7. The device of claim 1, wherein an axial height of a radial inner edge portion of the liquid retention baffle above the rough distribution tray is between about 100% and about 195% of a normal operating liquid level.

8. The device of claim 1, wherein the liquid retention baffle includes at least two portions extending radially inwardly from the overflow weir at different angles.

9. The device of claim 1, wherein the liquid retention baffle includes a first portion extending radially inwardly and generally orthogonal to the overflow weir and a second portion extending radially inwardly at an incline.

10. The device of claim 1, further comprising a reactor wall, wherein the rough distribution tray has a smaller diameter than a diameter of the reactor wall, and
   an annular space between the rough distribution tray and the reactor wall to provide a flow path for vapor to flow beneath the rough distribution tray.

11. The device of claim 1, wherein the axial height of a radial inner edge portion of the liquid retention baffle above the rough liquid distribution tray is between about 2% and about 5% of a diameter of the rough distribution tray.

12. A rough distribution device for use in a downflow reactor, the rough distribution device comprising:
   a rough distribution tray having a generally flat tray with a plurality of liquid outlet ports therethrough;
   an upstanding overflow weir at an edge portion of the rough distribution tray; and
   an upper liquid retention baffle of the overflow weir with at least a portion thereof extending radially inwardly to retain fluid within the rough liquid distribution tray.

13. The rough distribution device of claim 12, wherein the liquid retention baffle includes a baffle having one edge portion joined to an upper end portion of the overflow weir and an opposite edge portion extending inwardly in a radial direction.

14. The rough distribution device of claim 12, wherein the liquid retention baffle extends axially upward at an incline from the overflow weir upper end portion.

15. The rough distribution device of claim 12, wherein the liquid retention baffle extends axially downwardly at a decline from the overflow weir upper end portion.

16. The rough distribution device of claim 12, wherein the liquid retention baffle extends generally orthogonally from the overflow weir upper end portion.

17. The rough distribution device of claim 12, wherein the upstanding overflow weir includes an axial height above the rough distribution tray of between about 80% and about 195% of a normal operating liquid level.

18. The rough distribution device of claim 12, wherein the axial height of a radial inner edge portion of the liquid retention baffle above the rough liquid distribution tray is between about 100% and about 195% of a normal operating liquid level.

19. The rough distribution device of claim 12, wherein the axial height of a radial inner edge portion of the liquid retention baffle above the rough liquid distribution tray is between about 2% and about 5% of a diameter of the rough distribution tray.

20. The rough distribution device of claim 12, wherein the liquid retention baffle includes at least two portions extending radially inwardly from the liquid retention baffle at different angles.

* * * * *